(12) United States Patent
Briggs et al.

(10) Patent No.: US 7,566,890 B2
(45) Date of Patent: Jul. 28, 2009

(54) UV LIGHT SOURCE

(75) Inventors: David Briggs, Reading (GB); Richard Little, Southampton (GB)

(73) Assignee: JenAct Limited (GB)

( * ) Notice: Subject to any disclaimer, the term of this patent is extended or adjusted under 35 U.S.C. 154(b) by 380 days.

(21) Appl. No.: 10/968,536

(22) Filed: Oct. 19, 2004

(65) Prior Publication Data

US 2005/0264215 A1    Dec. 1, 2005

(30) Foreign Application Priority Data

Apr. 7, 2004    (GB)    ................... 0407911.7

(51) Int. Cl.
*A61N 5/06*    (2006.01)
(52) U.S. Cl. ............... 250/504 R; 250/493.1; 250/455.11
(58) Field of Classification Search ............... 315/39.51
See application file for complete search history.

(56) References Cited

U.S. PATENT DOCUMENTS

| | | | | |
|---|---|---|---|---|
| 3,911,318 | A | * | 10/1975 | Spero et al. ............... 315/39 |
| 4,245,179 | A | | 1/1981 | Buhrer ............... 315/248 |
| 4,266,167 | A | | 5/1981 | Proud et al. ............... 315/248 |
| 4,427,923 | A | * | 1/1984 | Proud et al. ............... 315/248 |
| 4,507,587 | A | | 3/1985 | Wood et al. ............... 315/39 |
| 4,933,602 | A | | 6/1990 | Ono et al. ............... 315/39 |
| 5,015,349 | A | * | 5/1991 | Suib et al. ............... 204/168 |
| 5,614,151 | A | * | 3/1997 | LeVay et al. ............... 422/24 |
| 5,725,757 | A | * | 3/1998 | Binot ............... 210/85 |
| 6,063,170 | A | | 5/2000 | Deibert ............... 96/224 |
| 6,087,774 | A | | 7/2000 | Nakayama et al. ............... 313/607 |
| 6,194,821 | B1 | | 2/2001 | Nakamura ............... 313/238 |
| 6,248,986 | B1 | | 6/2001 | Tran et al. ............... 219/679 |
| 6,369,371 | B2 | | 4/2002 | Havens et al. ............... 219/688 |
| 6,610,990 | B1 | | 8/2003 | Moruzzi ............... 250/504 R |
| 6,673,137 | B1 | | 1/2004 | Wen ............... 96/224 |
| 6,900,421 | B2 | | 5/2005 | Varma ............... 219/679 |
| 7,081,637 | B2 | | 7/2006 | Waluszko ............... 250/504 R |

(Continued)

FOREIGN PATENT DOCUMENTS

DE    40 10 809    10/1990

(Continued)

OTHER PUBLICATIONS

U.S. Appl. No. 09/831,449 (particulars unknown; unpublished application).

(Continued)

*Primary Examiner*—David A Vanore
*Assistant Examiner*—Andrew Smyth
(74) *Attorney, Agent, or Firm*—Fox Rothschild LLP

(57) ABSTRACT

An ultraviolet generator powered by a microwave source, such as a magnetron, is disclosed. The generator has an elongated inner element, preferably an electric conductor in the form of a polished metallic rod or an electrodeless bulb. An outer conductor, formed from an electrically conductive mesh or a perforated conductive material, is arranged around the inner element. One or more electrodeless ultraviolet bulbs are arranged, preferably radially, around the inner element within the outer conductor. The inner element and outer conductor are arranged for direct coupling to the microwave power source using a waveguide. The inner element is joined to the outer conductor by a disk positioned at the end of the generator opposite to the power source.

11 Claims, 1 Drawing Sheet

U.S. PATENT DOCUMENTS

| | | | |
|---|---|---|---|
| 2002/0098109 A1 | 7/2002 | Nelson et al. | 422/5 |
| 2003/0197476 A1 | 10/2003 | Little et al. | 315/248 |
| 2006/0060577 A1 | 3/2006 | Little et al. | 219/628 |
| 2007/0284315 A1 | 12/2007 | Collins et al. | 210/748 |

FOREIGN PATENT DOCUMENTS

| | | |
|---|---|---|
| GB | 2 048 589 | 12/1980 |
| GB | 2 307 097 | 5/1997 |
| GB | 2 399 216 | 9/2004 |
| GB | 2399216 | 9/2004 |
| JP | 10015546 | 1/1998 |
| JP | 11-045684 | 2/1999 |
| JP | 2000-311568 | 11/2000 |
| RU | 2191443 | 10/2002 |
| WO | WO 00/32244 | 6/2000 |
| WO | WO 01/09924 | 2/2001 |
| WO | WO03/021632 | 3/2003 |
| WO | WO03/094982 | 11/2003 |

OTHER PUBLICATIONS

U.S. Appl. No. 11/903,690 (particulars unknown; unpublished application).

* cited by examiner

UV LIGHT SOURCE

FIELD OF THE INVENTION

This invention relates to a UV generator which is particularly, though not exclusively, suitable for submerged use in water purification using microwave energy generated by a magnetron.

BACKGROUND OF THE INVENTION

WO01/09924, WO03/021632 and WO00/32244 disclose an arrangement in which a tube of quartz is lined with a mesh screen which then allows an electrodeless bulb to be inserted inside. Water is flowed around the outside of the quartz tube and is sterilized by the emitted ultraviolet radiation. GB2048589 shows a similar arrangement but not for ultraviolet applications.

U.S. Pat. No. 4,507,587 shows an electrodeless bulb having a waveguide which wholly surrounds the bulb, the waveguide being formed partly from a curved reflector and partly from a mesh arrangement. U.S. Pat. No. 4,933,602 shows a cavity coupled to a microwave source by a waveguide. Electrodeless bulbs are placed in the cavity and light is emitted through a mesh wall of the cavity. GB2307097 shows the use of an electrodeless bulb as an extension of the centre conductor of a coaxial cable. U.S. Pat. No. 3,911,318 shows a lamp surrounded by a concentric copper mesh screen which serves as a waveguide extension to a microwave generator 10.

SUMMARY OF THE INVENTION

In a first aspect, the invention provides a UV generator comprising a longitudinally extensive inner element, an outer conductor arranged around the inner element and one or more electrodeless UV bulbs arranged generally radially around the inner element and within the outer conductor, the inner element and the outer conductor being arranged for direct coupling to a microwave source such as a magnetron and the outer conductor being further arranged to be transmissive to UV light.

Thus this arrangement allows electrodeless bulbs to be located between the inner element and the outer conductor which provides advantages of shadowing and cooling potential in a fluid immersed embodiment. Furthermore, the direct coupling of the microwave source provides for reduced transition losses.

In a preferred embodiment, the or each electrodeless bulb is optimised for emission in the germicidal portion of the UK spectrum at a wavelength of approximately 254 nm. Other wavelengths may be used, for example, for other applications.

BRIEF SUMMARY OF THE DRAWINGS

Embodiments of the invention will now be described by way of example, with reference to the drawings in which.

DETAILED DESCRIPTION OF THE PREFERRED EMBODIMENTS

Figure 2:
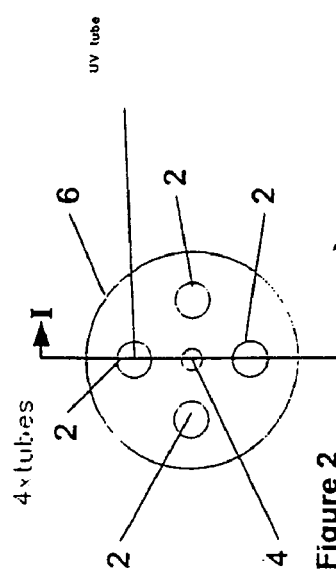
FIG. 2 is a sectional view along line II-II of FIG. 1.
Figure 1:
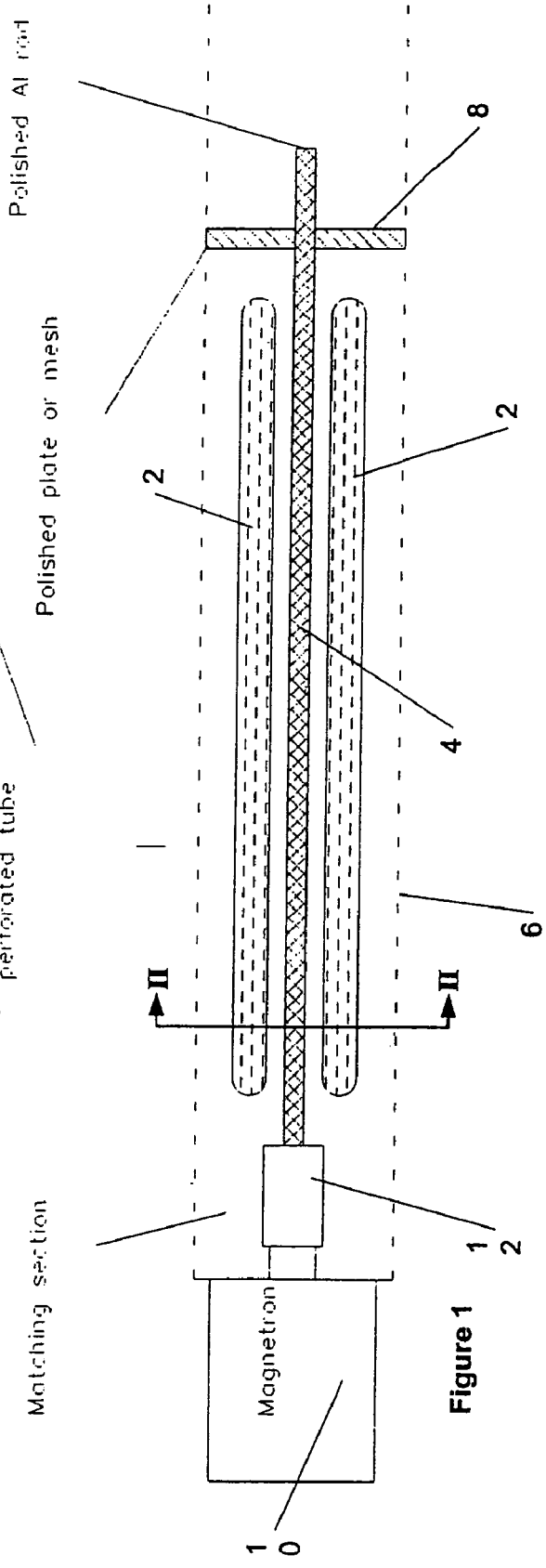
FIG. 1 is a sectional view along line I-I of FIG. 2.

With reference to FIGS. 1 and 2, one or more tubes 2 are located around an inner element 4 which in this embodiment, is the centre conductor of a coaxial line operating substantially in the TEM mode.

The inner conductor 4 is of polished aluminium and is typically round in section or shaped to reflect the UV light in such a way as to avoid re-absorption. Other simple shapes providing good reflection characteristics could be square or triangular, for example, depending on the number and size of tubes involved. In alternate embodiments, the inner element 4 may be an electrodeless bulb.

The coaxial outer 6 is preferably formed from a reticulated material such as electrically conductive mesh or from a perforated conductive material. The only essential function of the outer being that it is electrically conductive in order to contain an electromagnetic field and that it allows transmission of light in the UV spectrum.

The inner conductor 4 is joined to the outer by means of a solid or perforated disc 8 at the end furthest away from the generator. This forms a short circuit which reflects the microwave energy and produces a substantially uniform emission from the tubes 2.

Magnetrons are generally designed to transmit microwave power via a rectangular section waveguide operating in the TE10 mode. For this application a magnetron 10 has an antenna which is coupled to one of the internal cavities in the slow wave structure and is matched to the appropriate rectangular waveguide.

The usual method of coupling the magnetron output to a coaxial line is via a length of rectangular waveguide terminated with a waveguide/coax transition. Thus there are two points of transition loss.

Instead, in this new arrangement, the magnetron 10 is preferably coupled directly to the centre conductor 4 with an impedance transformer 12 formed by a section which is typically approximately $\lambda/4$ long (where $\lambda$ is the wavelength of the microwave energy) and a diameter typically of 20 millimetres. The dimensions of this matching section are generally found empirically to optimise the efficiency of energy transference into the bulbs for a particular combination of bulbs and spacings around the inner element. Coupling may alternatively be achieved using a coaxial waveguide.

This arrangement allows mounting of the magnetron 10 in line with the tubes thus enabling a substantial reduction in transition losses. Furthermore, the whole arrangement may be encased in a fluid-tight envelope (not shown) which allows the arrangement to be submerged in water for example. Preferably, the envelope is UV transmissive (quartz being a typically good material for its construction). This permits water-cooling of the magnetron and bulbs at the same time as allowing sterilisation of the surrounding water. The magnetron 10 may be immersed directly in water, it may be enclosed in a separate enclosure which may for example, be oil filled to aid heat transmission or it may be in the quartz envelope with the bulb. As a further alternative, the magnetron my remain out of the water.

Figure 3:
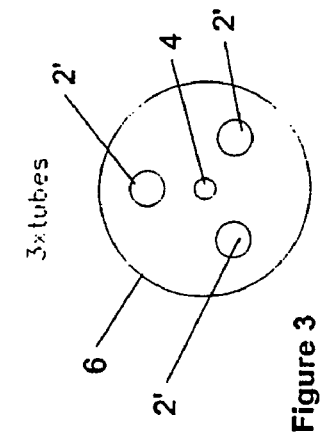
FIG. 3 is an alternative sectional view similar to that of FIG. 2.

FIG. 3 shows an alternative embodiment in which three bulbs 2' are arranged generally radially around the inner element 4.

As a further enhancement, the 'striking' of the electrodeless bulbs may be facilitated using a high voltage spark induced across or adjacent the bulb. This may for example, be produced using piezo-electric materials with suitable mechanical actuators as is know in the art or using inductive means such as an electrical transformer arrangement. The spark may be produced between an electrode adjacent the bulb and the outer 6.

In a further alternative, a bulb having an annular section may be located around the inner element 10.

As a yet further enhancement, the inner element 4 may be hollow to allow longitudinal flow of cooling gas such as air.

By arranging for the inner element to be perforated to allow ingress or egress of cooling gas (so generating a slight negative or positive pressure respectively around the inner element 4), cooling gas may be caused to flow past the or each electrodeless bulb to promote cooling thereof.

What is claimed is:

1. A UV generator comprising a longitudinally extensive inner element, an outer conductor arranged around the inner element and one or more electrodeless UV bulbs arranged generally radially around and at a distance from the inner element and within the outer conductor, the inner element and the outer conductor being arranged for direct coupling to a microwave source and the outer conductor being further arranged to be transmissive to UV light.

2. A generator according to claim 1, wherein the inner element is an electrical conductor.

3. A generator according to claim 2, wherein the inner element is a metallic rod which is preferably polished.

4. A generator according to claim 3, wherein the inner element is arranged to provide a distinct longitudinally extensive, preferably focused, reflective surface for the or each UV bulb.

5. A generator according to claim 3, wherein the inner element is formed from alumimium.

6. A generator according to claim 1, wherein the inner element is an electrodeless bulb.

7. A generator according to claim 1 including a UV transmissive fluid-tight envelope arranged around the outer conductor which allows the generator to operate whilst immersed in a fluid such as water.

8. A generator according to claim 7, wherein the envelope is formed from quartz.

9. A generator according to claim 1, including a spark generator arranged to generate a spark through or adjacent the bulb or bulbs in order to encourage ignition of the bulb or bulbs.

10. A generator according to claim 1, wherein the inner element is hollow to allow longitudinal flow of cooling gas and wherein the inner element is perforated to allow ingress or egress of cooling gas, whereby cooling gas is caused to flow past the electrodeless bulbs to provide cooling thereof.

11. A UV generator comprising a longitudinally extensive inner element, an outer conductor arranged around the inner element and one or more electrodeless UV bulbs arranged generally radially around and at a distance from the inner element and within the outer conductor, the inner element and the outer conductor being arranged for coupling to a microwave source and the outer conductor being further arranged to be transmissive to UV light.

* * * * *